US012007310B2

(12) United States Patent
Miyazaki

(10) Patent No.: US 12,007,310 B2
(45) Date of Patent: Jun. 11, 2024

(54) STATE MONITORING DEVICE AND STATE MONITORING SYSTEM

(71) Applicant: NTN CORPORATION, Osaka (JP)

(72) Inventor: Makoto Miyazaki, Kuwana (JP)

(73) Assignee: NTN CORPORATION, Osaka (JP)

( * ) Notice: Subject to any disclaimer, the term of this patent is extended or adjusted under 35 U.S.C. 154(b) by 720 days.

(21) Appl. No.: 17/255,399

(22) PCT Filed: Jul. 4, 2019

(86) PCT No.: PCT/JP2019/026649
§ 371 (c)(1),
(2) Date: Dec. 22, 2020

(87) PCT Pub. No.: WO2020/013074
PCT Pub. Date: Jan. 16, 2020

(65) Prior Publication Data
US 2021/0293665 A1 Sep. 23, 2021

(30) Foreign Application Priority Data

Jul. 13, 2018 (JP) .................................. 2018-133003
Mar. 5, 2019 (JP) .................................. 2019-039666

(51) Int. Cl.
F03D 17/00 (2016.01)
G01M 13/028 (2019.01)
(Continued)

(52) U.S. Cl.
CPC ............ G01M 99/005 (2013.01); F03D 17/00 (2016.05); G01P 3/00 (2013.01); G01P 15/00 (2013.01);
(Continued)

(58) Field of Classification Search
CPC ........................................................ G01P 3/00
See application file for complete search history.

(56) References Cited

U.S. PATENT DOCUMENTS 5,744,723 A 4/1998 Piety
2012/0330578 A1* 12/2012 Kar ........................ G01H 1/003
702/56
(Continued)

FOREIGN PATENT DOCUMENTS

CN 1738574 A 2/2006
CN 102155988 A 8/2011
(Continued)

OTHER PUBLICATIONS

Chen Shi et al., "Gait Recognition with Wavelet Moments of Silhouette Change Images," Journal of Xi'an Jiaotong University, vol. 43, No. 1, Jan. 10, 2009, pp. 90-94.
(Continued)

Primary Examiner — Daniel J Colilla
(74) Attorney, Agent, or Firm — Rimon P.C.

(57) ABSTRACT

Provided is abnormality diagnosis with improved stability on an appliance to which a rotational torque is transmitted from a rotating body. A state monitoring device monitors the state of an appliance to which the rotational torque of a rotating body is transmitted. The state monitoring device includes a storage unit and a controller. Specific information depending on a rotational speed of the rotating body, produced from vibration data of the appliance, is pre-stored in the storage unit. Using the rotational speed of the rotating body and the vibration data of the appliance, the controller performs abnormality diagnosis on the appliance. Using the specific information, the controller estimates the rotational speed of the rotating body, the rotational speed being a rotational speed when the vibration data of the appliance is measured.

7 Claims, 16 Drawing Sheets

(51) Int. Cl.
  *G01M 99/00* (2011.01)
  *G01P 3/00* (2006.01)
  *G01P 15/00* (2006.01)
(52) U.S. Cl.
  CPC ..... *F05B 2260/80* (2013.01); *F05B 2270/334* (2013.01)

(56) References Cited

U.S. PATENT DOCUMENTS

| 2015/0116131 | A1 | 4/2015 | Ikeda et al. |
| 2017/0234304 | A1 | 8/2017 | Sakaguchi |
| 2017/0269118 | A1 | 9/2017 | Liu et al. |
| 2017/0343451 | A1 | 11/2017 | Yoshida |
| 2019/0195192 | A1 | 6/2019 | Takahashi |
| 2019/0293483 | A1* | 9/2019 | Duke ................ G06F 17/17 |
| 2019/0310280 | A1* | 10/2019 | Hayzen .............. G01P 3/48 |

FOREIGN PATENT DOCUMENTS

| CN | 102693216 A | 9/2012 | |
| CN | 104123546 A | 10/2014 | |
| CN | 105866250 A | 8/2016 | |
| CN | 106574606 A | 4/2017 | |
| CN | 107110703 A | 8/2017 | |
| GB | 2491983 A | * 12/2012 | ............ G01M 15/14 |
| JP | H06-023968 A | 2/1994 | |
| JP | 2013-185507 A | 9/2013 | |
| JP | 2018-036124 A | 3/2018 | |
| WO | 2004/046877 A2 | 6/2004 | |
| WO | 2018/043009 A1 | 3/2018 | |

OTHER PUBLICATIONS

Wu Wei et al., "Holospectrum series similarity matching for rotating machinery fault diagnosis," Chinese Journal of Scientific Instrument, vol. 30, No. 3, Mar. 15, 2009, pp. 536-541.
Chinese Office Action issued in corresponding Chinese Patent Application No. 201980046722.1, dated Jan. 20, 2023, with English translation.
International Search Report issued in corresponding International Patent Application No. PCT/JP2019/026649, dated Sep. 10, 2019, with English translation.
Japanese Office Action issued in corresponding Japanese Patent Application No. 2019-039666, dated Sep. 27, 1 2022, with English translation.

* cited by examiner

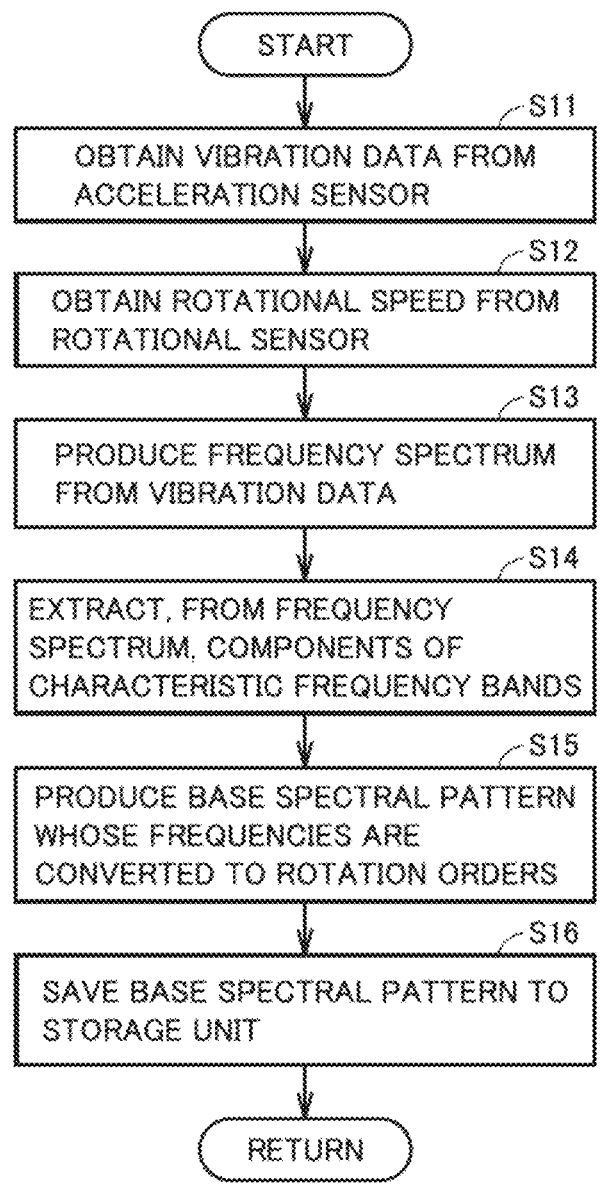

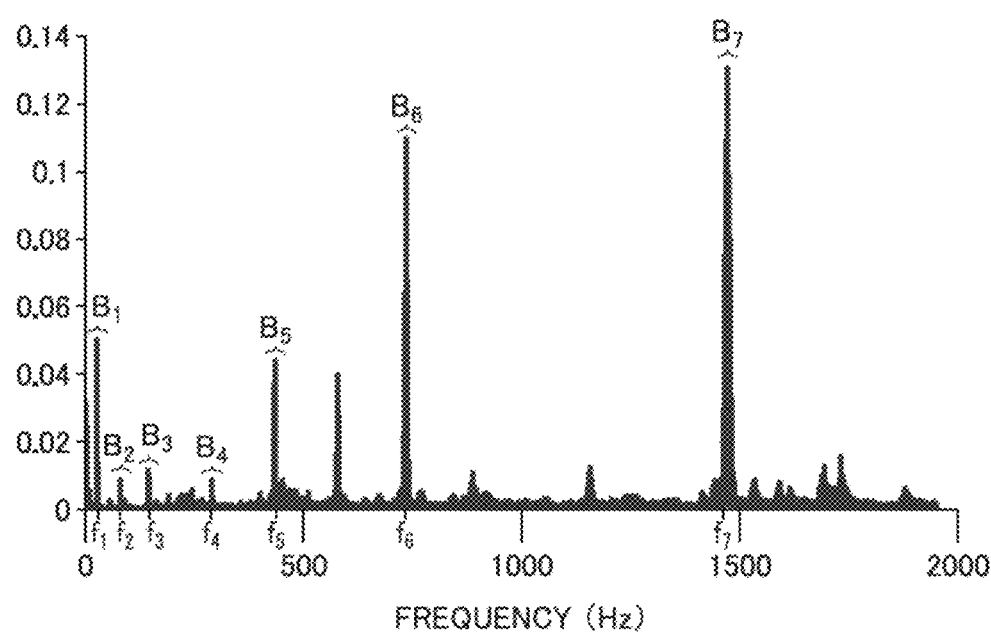
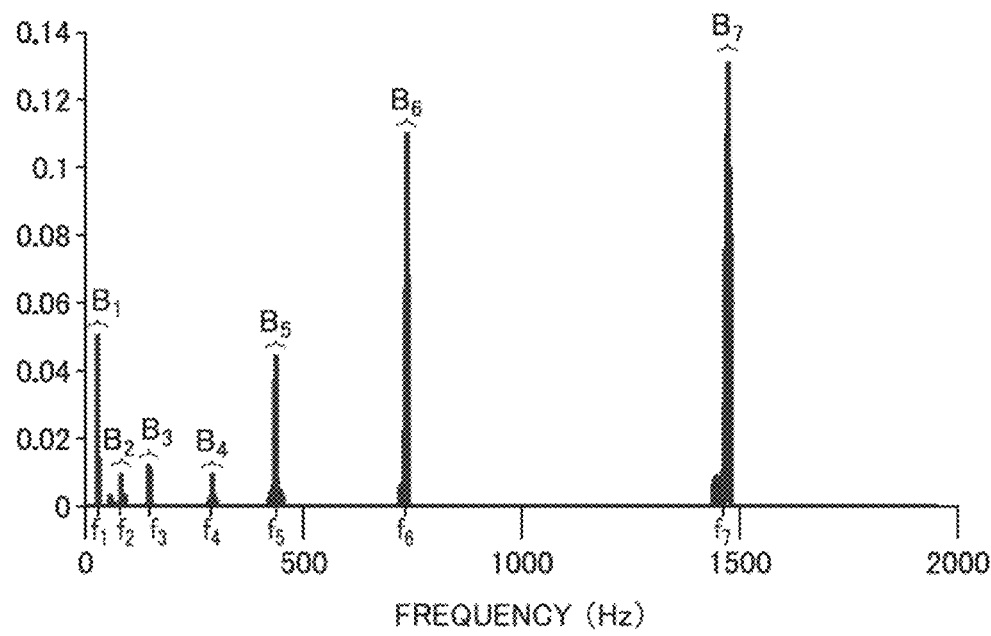

FIG.10
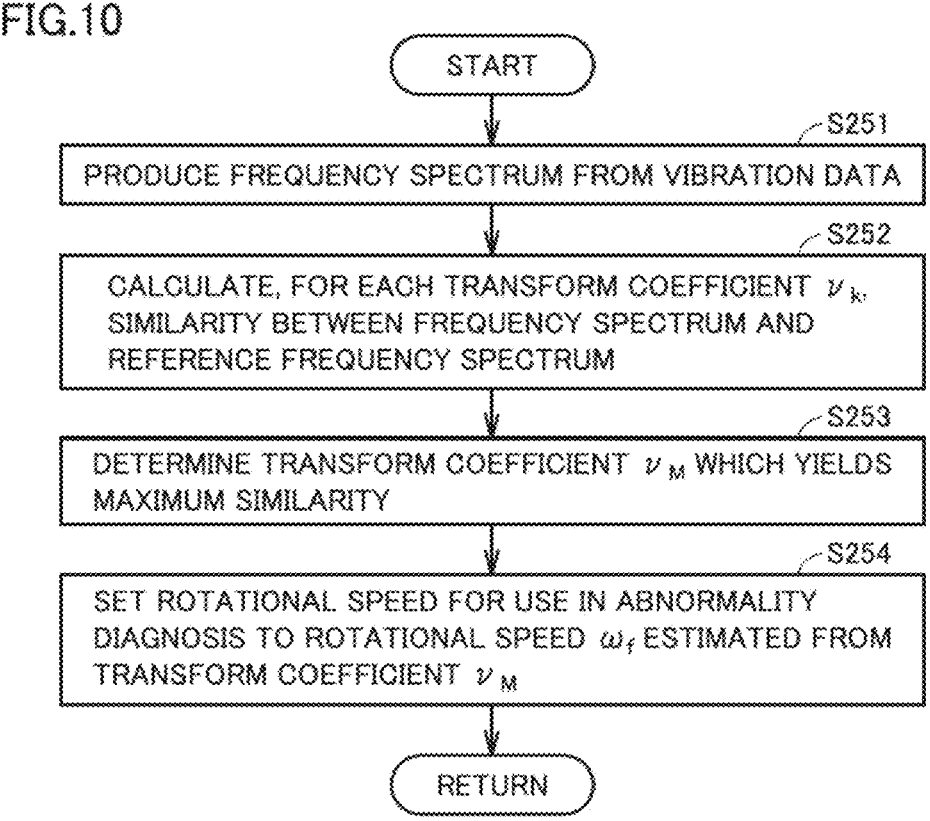
FIG.11
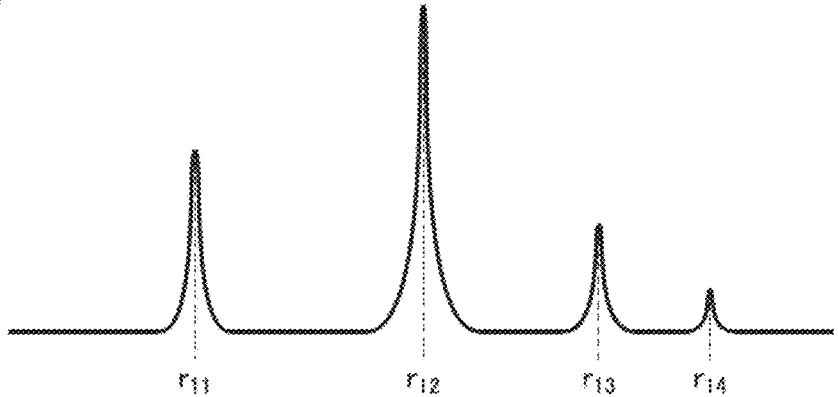
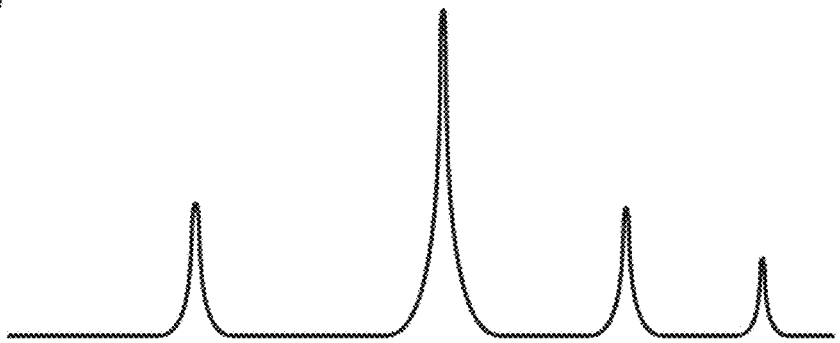

FIG.12
(a)
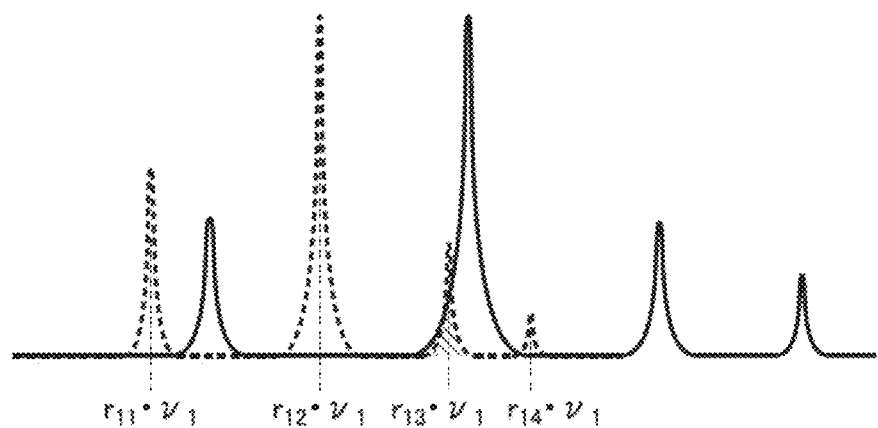
(b)
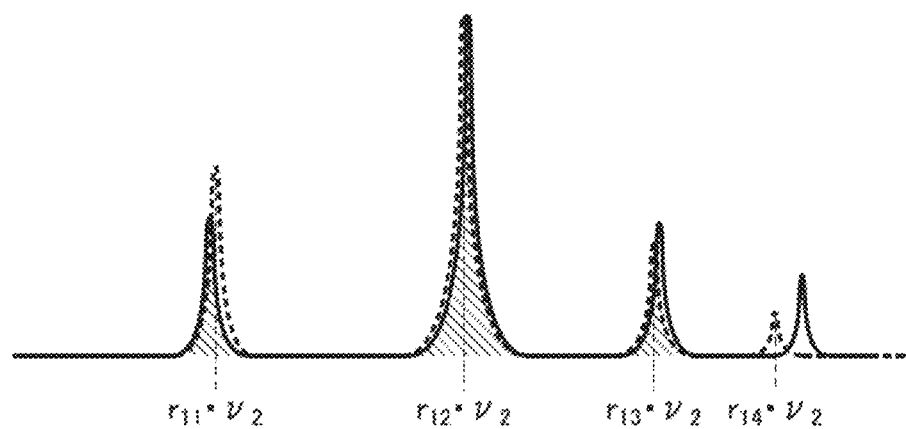
(c)
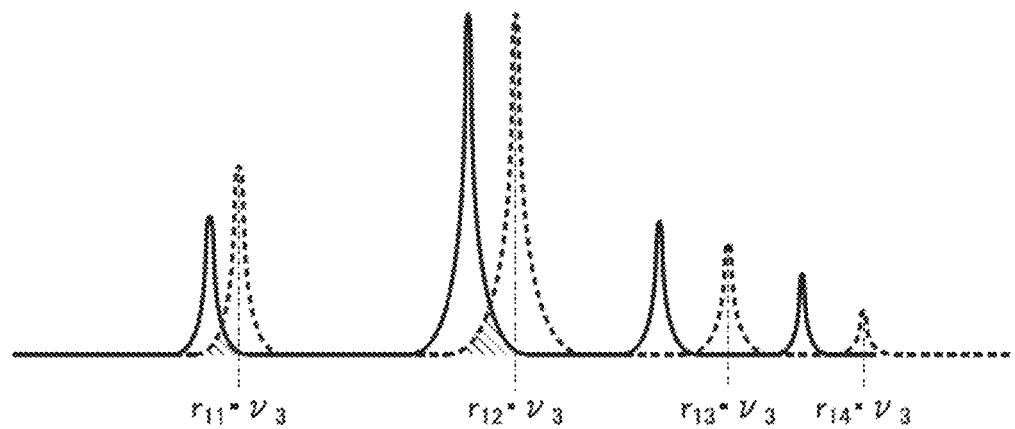

STATE MONITORING DEVICE AND STATE MONITORING SYSTEM

CROSS REFERENCE TO RELATED APPLICATIONS

This patent application is the U.S. National Phase under 35 U.S.C. § 371 of International Application No. PCT/JP2019/026649, filed on Jul. 4, 2019, which claims the benefit of Japanese Patent Application No. 2019-039666, dated Mar. 5, 2019, and Japanese Patent Application No. 2018-133003, dated Jul. 13, 2018, the entire contents of each are hereby incorporated by reference in their entirety.

TECHNICAL FIELD

The present invention relates to a state monitoring device and a state monitoring system, and, more particularly, to a state monitoring device and a state monitoring system that monitor the state of an appliance to which the rotational torque is transmitted from a rotating body.

BACKGROUND ART

Conventionally, state monitoring devices and state monitoring systems are known which monitor the state of an appliance to which the rotational torque is transmitted from a rotating body. For example, Japanese Patent Laying-Open No. 2013-185507 (PTL 1) discloses a state monitoring system which determines whether diagnostic parameters calculated from vibration data of appliances (e.g., the main bearing and the step-up gearbox), which are included in a wind power generator, exceed thresholds, thereby diagnosing the states of the appliances. According to the state monitoring system, the thresholds are generated from the vibration data that is measured when operating conditions of the wind power generator satisfy diagnostic operating conditions, thereby allowing accurate abnormality diagnosis of the appliances included in the wind power generator.

CITATION LIST

Patent Literature

PTL 1: Japanese Patent Laying-Open No. 2013-185507

SUMMARY OF INVENTION

Technical Problem

The state monitoring system disclosed in PTL 1 calculates, as diagnostic parameters, a rotational frequency component and a harmonic frequency component of the rotational frequency from the vibration data of an appliance to which the rotational torque is transmitted from the rotating body, and performs the abnormality diagnosis on the appliance, using the diagnostic parameters. The calculation of the diagnostic parameter requires the rotational speed of the rotating body. Typically, the rotational speed is measured by a rotational sensor.

As with the state monitoring system disclosed in PTL 1, if the rotational speed of a rotating body is required for the abnormality diagnosis on an appliance to which the rotational torque is transmitted from the rotating body, and the rotational speed of the rotating body from the rotational sensor is not available due to, for example, a failure of the rotational sensor, the abnormality diagnosis on the appliance is difficult to be performed.

The present invention is made to solve problems as described above, and an object of the present invention is to provide the abnormality diagnosis with improved stability on an appliance to which the rotational torque is transmitted from a rotating body.

Solution to Problem

A state monitoring device according to the present invention monitors a state of an appliance to which a rotational torque of a rotating body is transmitted. The state monitoring device includes a storage unit and a controller. The storage unit pre-stores specific information produced from vibration data of an appliance, the specific information depending on a rotational speed of the rotating body. Using the rotational speed of the rotating body and the vibration data of the appliance, the controller performs an abnormality diagnosis on the appliance. Using the specific information, the controller estimates the rotational speed of the rotating body, the rotational speed being a rotational speed when the vibration data is measured.

Advantageous Effects of Invention

In the state monitoring device according to the present invention, the rotational speed of the rotating body is estimated, using the specific information depending on the rotational speed of the rotating body, which is produced from the vibration data of the appliance. Thus, the abnormality diagnosis using the rotational speed of that rotating body will not be interrupted. According to the state monitoring device of the present invention, the abnormality diagnosis is performed with improved stability on the appliance to which the rotational torque is transmitted from the rotating body.

BRIEF DESCRIPTION OF DRAWINGS

FIG. 5 is a flowchart showing a flow of a process for producing a base spectral pattern, which is performed by the controller, prior to the abnormality diagnosis.

FIG. 6 is a diagram illustrating an example of a frequency spectrum produced by the frequency spectrum production process of FIG. 5.

FIG. 7 is a diagram showing a frequency spectrum obtained by extracting characteristic frequency bands from the frequency spectrum of FIG. 6.

FIG. 10 is a flowchart showing a specific flow of process of the rotational speed estimation process of FIG. 9.

FIG. 11 is a diagram showing (a) one example base spectral pattern, and (b) one example frequency spectrum which is produced from vibration data that is measured at the abnormality diagnosis.

FIG. 12 is a diagram showing a reference frequency spectrum (the dotted line) and the frequency spectrum (the solid line) of FIG. 11 overlaid, one on top of the other.

DESCRIPTION OF EMBODIMENTS

Figure 1:
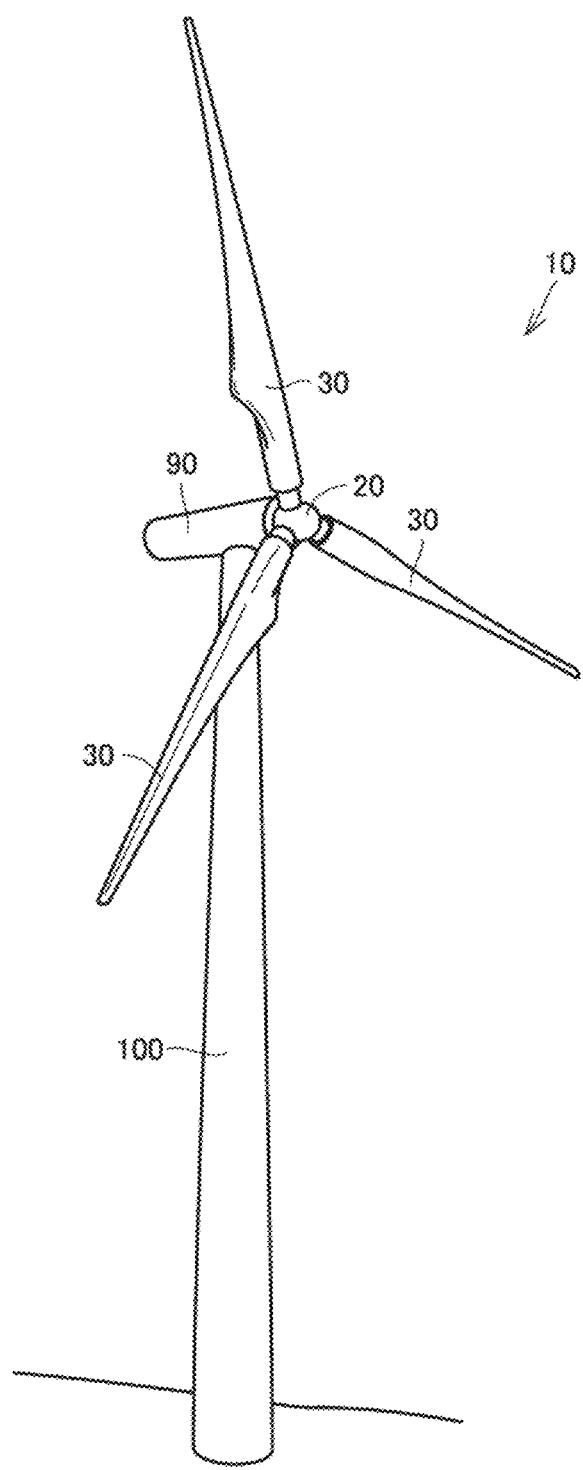
FIG. 1 is an external view of a wind power generator which includes appliances to be monitored by a state monitoring system according to Embodiment 1.

Hereinafter, embodiments of the present invention will be described, with reference to the accompanying drawings. Note that like reference signs are used to refer to like or corresponding parts in the drawings, and the description thereof will not be repeated.

Embodiment 1

FIG. 1 is an external view of a wind power generator 10 which includes appliances to be monitored by a state monitoring system according to Embodiment 1. As shown in FIG. 1, the wind power generator 10 includes a tower 100, a nacelle 90, and a rotor head 20 disposed on the top end of the tower 100. The rotor head 20 is connected to a tip of the main shaft of the wind power generator 10. The main shaft is supported within the nacelle 90 and connected to a step-up gearbox. Multiple blades 30 are attached to the rotor head 20.

The wind power generator 10 changes angles (hereinafter, also referred to as blade pitches) of the blades 30 relative to the direction of wind, in response to a velocity of the wind, to acquire a reasonable degree of rotation of the blades 30. The blade pitches are also controlled to start and stop the windmill. As a result, the amount of energy obtained from the wind can be adjusted. In high wind, for example, the wind-struck surfaces (also called surfaces or blade surfaces) of the blades are arranged in parallel with the direction of the wind to arrest the rotation of the windmill.

Figure 2:
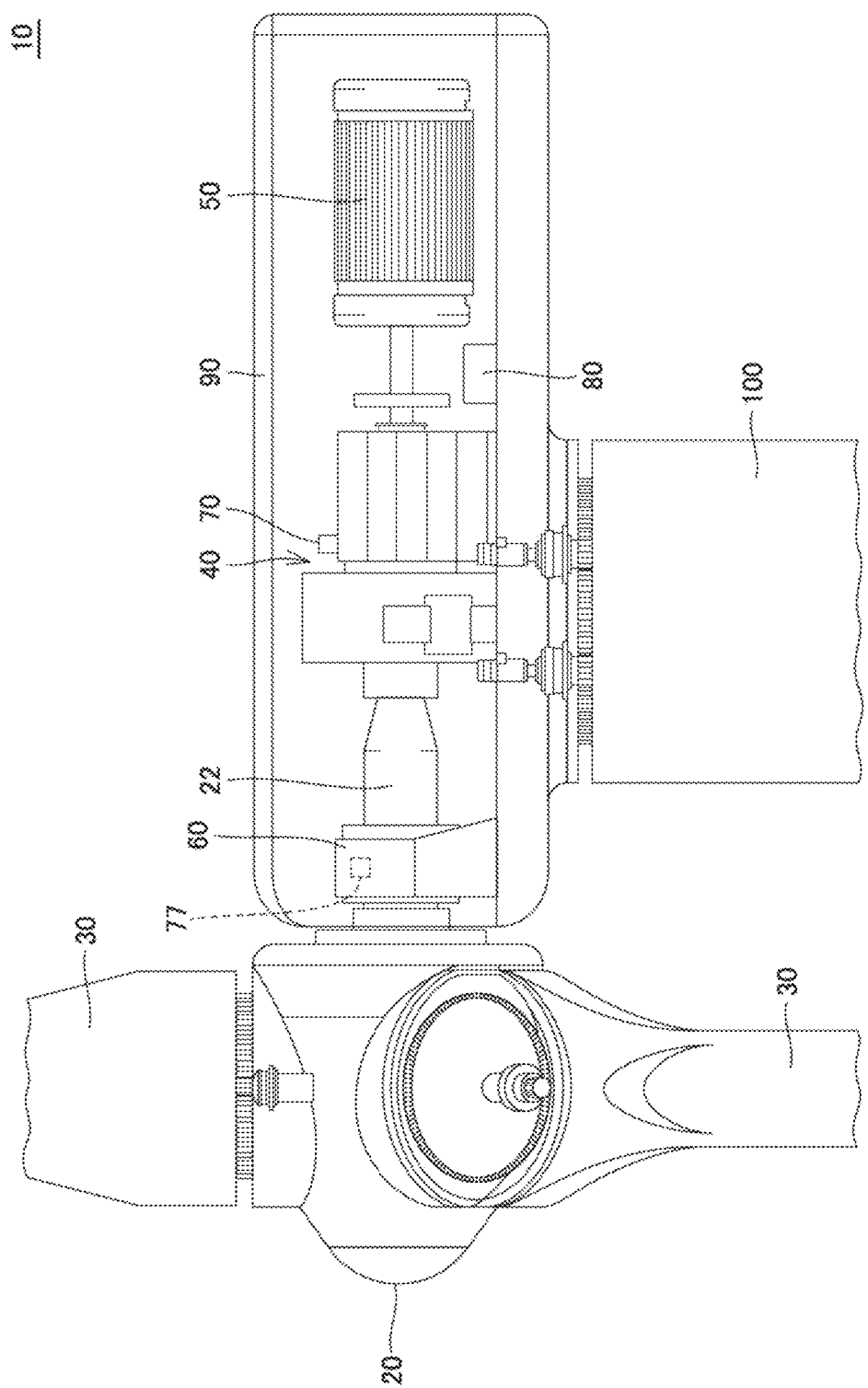
FIG. 2 is a diagram schematically showing the inside of a nacelle of the wind power generator of FIG. 1.

FIG. 2 is a diagram schematically showing the inside of the nacelle 90 of the wind power generator 10 of FIG. 1. As shown in FIG. 2, the nacelle 90 includes a main shaft 22 (a rotating body), the blades 30, a step-up gearbox 40, a generator 50, a main bearing 60, an acceleration sensor 70, and a state monitoring device 80. The step-up gearbox 40, the generator 50, the main bearing 60, the acceleration sensor 70 (a vibration sensor), a rotational sensor 77, and the state monitoring device 80 are accommodated in the nacelle 90. The nacelle 90 is supported by the tower 100.

The main shaft 22 enters the nacelle 90 and is connected to the input axis of the step-up gearbox 40. The main shaft 22 is rotatably supported by the main bearing 60. The main shaft 22 transmits to the input axis of the step-up gearbox 40 a rotational torque which is generated by the blades 30 subjected to a wind force. The blades 30 are disposed on the tip of the main shaft 22 via the rotor head 20, convert the wind force into a rotational torque, and transmit the rotational torque to the main shaft 22.

The main bearing 60 is fixedly installed within the nacelle 90, rotatably supporting the main shaft 22. The main bearing 60 is configured of a rolling bearing, for example, a self-aligning bearing, a tapered roller bearing, a straight roller bearing, or a ball bearing, etc. Note that these bearings may be of a single-row or a double-row.

The acceleration sensor 70 is installed on the upper surface of the step-up gearbox 40, and measures vibration data of the step-up gearbox 40. The rotational sensor 77 is installed within the main bearing 60, and measures a rotational speed of the main shaft 22.

The step-up gearbox 40 is disposed between the main shaft 22 and the generator 50. The step-up gearbox 40 increases and outputs the rotational speed of the main shaft 22 to the generator 50. By way of example, the step-up gearbox 40 is configured of a gear increasing mechanism which includes a planetary gear, an intermediate shaft, and a high speed shaft, for example. Note that, although not shown specifically, multiple bearings for rotatably supporting the multiple shafts are also disposed within the step-up gearbox 40.

The generator 50 is connected to the output axis of the step-up gearbox 40, and generates power with the rotational torque received from the step-up gearbox 40. The generator 50 is configured of an induction generator, for example. Note that bearings for rotatably supporting rotors are also disposed within the generator 50.

The state monitoring device 80 is disposed within the nacelle 90, and receives the vibration data measured by the acceleration sensor 70, and the rotational speed measured by the rotational sensor 77. The state monitoring device 80 is connected to the acceleration sensor 70 and the rotational sensor 77 by wired cables not shown.

Figure 3:
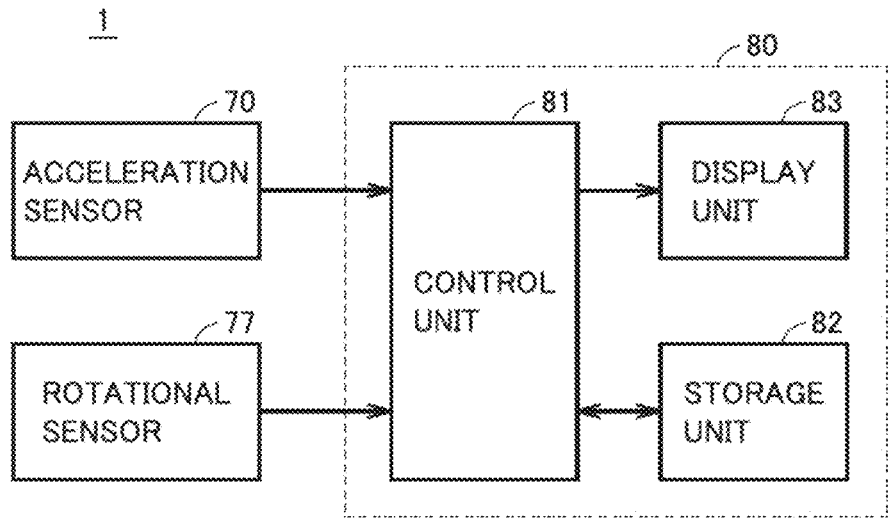
FIG. 3 is a functional block diagram showing a functional configuration of the state monitoring system according to Embodiment 1.

FIG. 3 is a functional block diagram showing a functional configuration of a state monitoring system 1 according to Embodiment 1. As shown in FIG. 3, the state monitoring system 1 includes the acceleration sensor 70, the rotational sensor 77, and the state monitoring device 80. The state monitoring device 80 includes a controller 81, a storage unit 82, and a display unit 83.

The acceleration sensor 70 is, for example, an acceleration sensor using a piezoelectric device. The acceleration sensor 70 measures and outputs the acceleration of a monitored target to the controller 81. The rotational sensor 77 measures and outputs the rotational speed of the main shaft 22 to the controller 81.

Using the vibration data measured by the acceleration sensor 70 and the rotational speed of the main shaft 22, the controller 81 performs abnormality diagnosis on the monitored target. The controller 81 includes a computer, such as a CPU (Central Processing Unit).

The storage unit 82 includes anon-volatile memory. The vibration data measured by the acceleration sensor 70 is saved to the storage unit 82. A gear mesh frequency of the gear included in the step-up gearbox 40 or information that is necessary to determine the gear mesh frequency (e.g., the number of gear teeth, and a ratio of the rotational speed of the gear to the rotational speed of the main shaft 22) is pre-stored in the storage unit 82. A result of the abnormality diagnosis performed by the controller 81 is displayed on the display unit 83.

Figure 4:
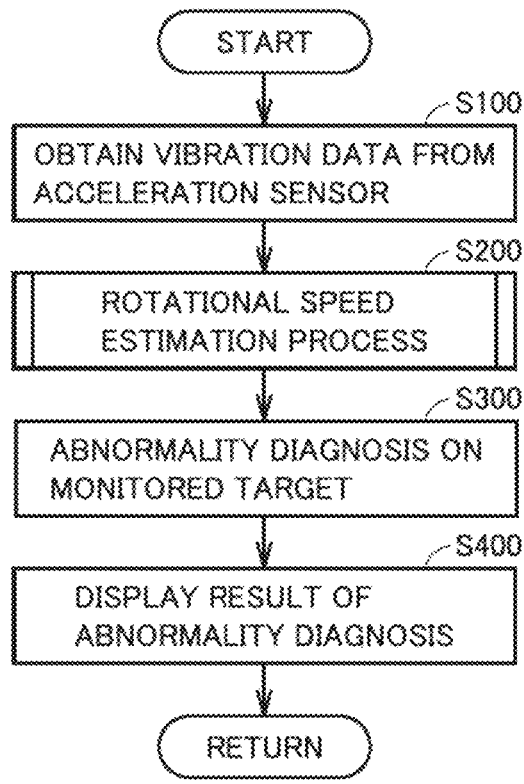
FIG. 4 is a flowchart showing a flow of a process for abnormality diagnosis performed by a controller of FIG. 3.

FIG. 4 is a flowchart showing a flow of a process for the abnormality diagnosis performed by the controller 81 of FIG. 3. The process illustrated in FIG. 4 is called by the main routine (not shown) which controls the state monitoring system 1 of FIG. 3 in an integrated manner. In the following, each step will be simply described as S.

As shown in FIG. 4, in S100, the controller 81 obtains the vibration data from the acceleration sensor 70, and passes the process to S200. In S200, the controller 81 obtains the rotational speed of the main shaft 22 to be used for the abnormality diagnosis, and passes the process to S300. In S300, the controller 81 performs the abnormality diagnosis on a monitored target. In S400, the controller 81 displays a result of the abnormality diagnosis on the display unit 83 and returns the process to the main routine.

In S400, from the vibration data of the step-up gearbox 40, for example, a gear mesh frequency component and a harmonic frequency component of the mesh frequency are calculated as diagnostic parameters, and the abnormality diagnosis is performed using these diagnostic parameters. The rotational speed of the main shaft 22 is required to calculate the gear mesh frequency.

In the state monitoring system 1, if the rotational speed of the main shaft 22 is not available from the rotational sensor 77 due to a failure of the rotational sensor 77, it is difficult to perform the abnormality diagnosis on a monitored target.

Thus, in the state monitoring system 1, prior to the abnormality diagnosis, the rotational sensor 77 in the normal state measures vibration data of the monitored target, and the controller 81 produces a base spectral pattern, using the vibration data and the rotational speed measured by the rotational sensor 77. At the abnormality diagnosis, if the rotational speed of the main shaft 22 is not available from the rotational sensor 77, the controller 81 estimates the rotational speed of the main shaft 22, using the base spectral pattern. In the state monitoring system 1, owing to the rotating body's rotational speed estimation functionality, the abnormality diagnosis will not be interrupted by a failure of the rotational sensor 77 or the like. According to the state monitoring system 1, the abnormality diagnosis is performed with improved stability on an appliance to which the rotational torque is transmitted from the rotating body.

FIG. 5 is a flowchart showing a flow of a process for producing the base spectral pattern, which is performed by the controller 81, prior to the abnormality diagnosis. As shown in FIG. 5, in S11, the controller 81 obtains the vibration data (first vibration data) from the acceleration sensor 70, and passes the process to S12. In S12, the controller 81 obtains the rotational speed (a specific rotational speed) of the main shaft from the rotational sensor 77, and passes the process to S13. In S13, the controller 81 produces a frequency spectrum (a first frequency spectrum) from the vibration data, and passes the process to S14. In S14, the controller 81 sets to zero the intensities corresponding to all the frequencies that are not included in the characteristic frequency bands (each a frequency band that includes a characteristic frequency) of the frequency spectrum, and passes the process to S15. In S15, the controller 81 converts each of the frequencies of the frequency spectrum into a rotation order (a ratio of each frequency of the frequency spectrum to a rotational frequency corresponding to the specific rotational speed), produces a base spectral pattern, and passes the process to S16. In S16, the controller 81 saves the base spectral pattern (specific information) to the storage unit 82, and returns the process to the main routine.

FIG. 6 is a diagram illustrating an example of the frequency spectrum produced by the frequency spectrum production process (S13) of FIG. 5. In FIG. 6, characteristic frequencies $f_1$ to $f_7$ are gear mesh frequencies (specific frequencies) of the gear included in the step-up gearbox 40 and harmonic frequencies of the mesh frequencies.

As shown in FIG. 6, peaks, representing characteristics of the frequency spectrum, occur in the vicinity of the characteristic frequencies $f_1$ to $f_7$. Thus, the state monitoring system 1 extracts, from the frequency spectrum, components of the characteristic frequency bands $B_1$ to $B_7$ that include the characteristic frequencies $f_1$ to $f_7$, and sets to zero the intensities corresponding to the frequencies not included in the characteristic frequency bands $B_1$ to $B_7$, as shown in FIG. 7. In the state monitoring system 1, the frequency band $B_n$ is in a range ($0.95 \cdot f_n$ to $1.05 \cdot f_n$) within 5% of the characteristic frequency $f_n$.

Figure 8:
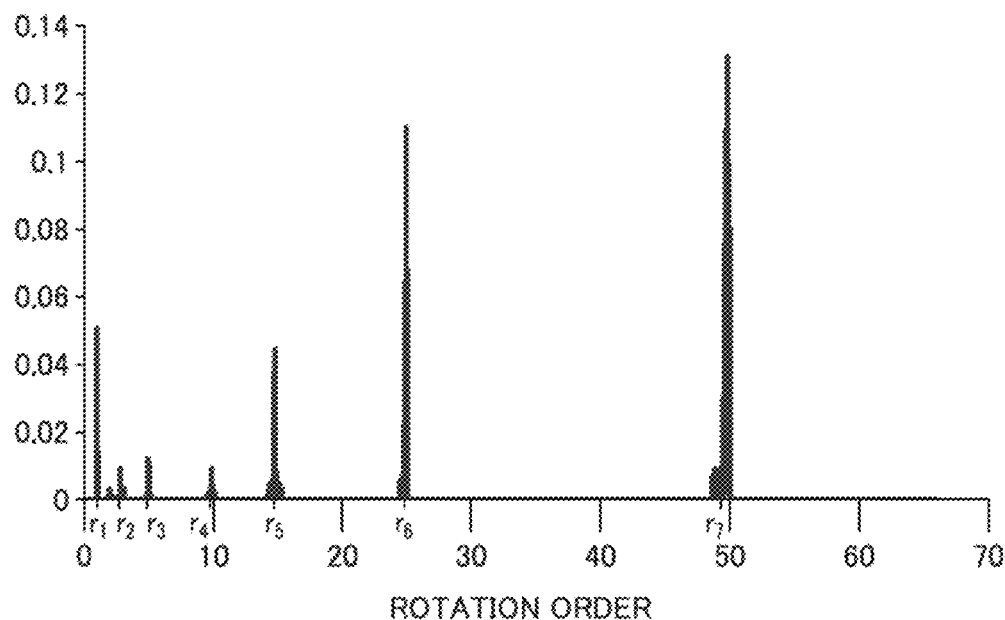
FIG. 8 is a diagram showing a base spectral pattern obtained by converting the frequencies of the frequency spectrum of FIG. 7 each into a rotation order.

FIG. 8 is a diagram showing the base spectral pattern obtained by converting each of the frequencies of the frequency spectrum of FIG. 7 into a rotation order. The base spectral pattern is a spectrum indicating that a characteristic peak occurs in the vicinity of a frequency that is how many times the rotational frequency of the main shaft 22. The base spectral pattern is produced, prior to the abnormality diagnosis, and saved to the storage unit 82.

Figure 9:
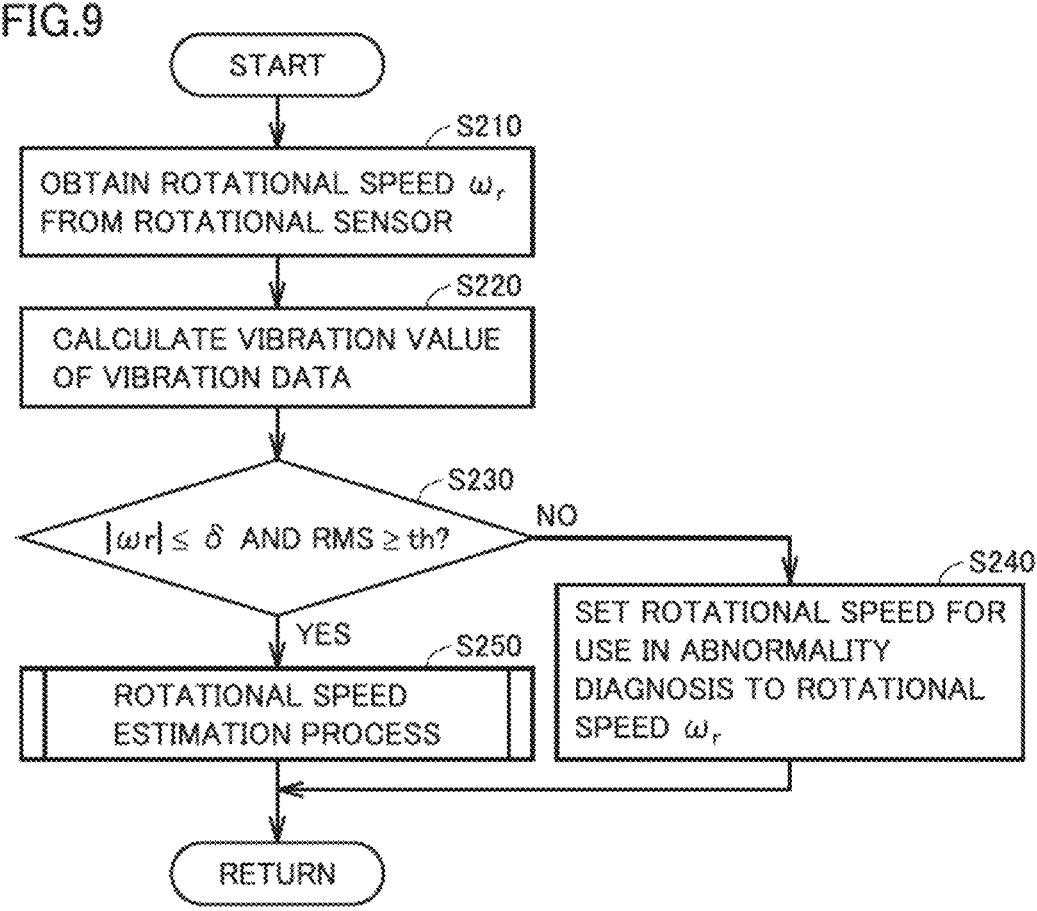
FIG. 9 is a flowchart showing a specific flow of process of the rotational speed setting process illustrated in the flowchart of FIG. 4.

FIG. 9 is a flowchart showing a specific flow of process of the rotational speed setting process (S200) illustrated in the flowchart of FIG. 4. As shown in FIG. 9, in S210, the controller 81 obtains a rotational speed $\omega_r$ from the rotational sensor 77, and passes the process to S220. In S220, the controller 81 calculates a vibration value of the vibration data, and passes the process to S230.

The vibration value may be any value insofar as it is a parameter correlated to the vibrational energy. Examples of the vibration value include rms (Root Mean Square) or OA (Overall) value. Desirably, the vibration value is calculated from the vibration data whose frequency band is limited. Limiting the frequency band of the vibration data can, for example, prevent introduction of noise into the vibration data or reduce the impact of disturbance vibration on the vibration data. Thus, the abnormality diagnosis using the vibration value can be performed with improved accuracy.

In S230, the controller 81 determines whether the rotational sensor 77 is faulty. Specifically, if a fault condition is met that the absolute value of the rotational speed $\omega_r$ is less than or equal to a threshold δ and the vibration value is greater than or equal to a threshold th, the controller 81 determines that the rotational sensor 77 is faulty. The absolute value of the rotational speed $\omega_r$ being less than or equal to the threshold $\delta$ means that the absolute value of the rotational speed $\omega_r$ is small to an extent that the rotational speed $\omega_r$ can be approximated as zero. The vibration value being greater than or equal to the threshold th means that a monitored target is vibrating to a non-negligible extent, that is, the main shaft 22 is sufficiently rotated to transmit the rotational torque to the step-up gearbox 40 and the step-up gearbox 40 is vibrating to a non-negligible extent. The absolute value of the rotational speed $\omega_r$ being less than or equal to the threshold $\delta$ in such a case means that the rotational sensor 77 is failing to measure the actual rotational speed of the main shaft 22.

If the fault condition is not met (NO in S230), the controller 81, in S240, sets a rotational speed for use in the abnormality diagnosis to the rotational speed $\omega_r$ from the rotational sensor 77, and returns the process to the main routine. If the fault condition is met (YES in S230), the controller 81 performs the rotational speed estimation process in S250, sets the rotational speed for use in the abnormality diagnosis to the estimated rotational speed, and returns the process to the main routine.

FIG. 10 is a flowchart showing a specific flow of process of the rotational speed estimation process (S250) of FIG. 9. In S251, the controller 81 produces a frequency spectrum (a second frequency spectrum) from the vibration data, and passes the process to S252. In S252, the controller 81 varies a transform coefficient $v_k$ within a predetermined range ($v_{min} \leq v_k \leq v_{max}$), and calculates, for each transform coefficient $v_k$, the inner product of the frequency spectrum and a reference frequency spectrum (a third frequency spectrum) as a similarity $sm(v_k)$, and passes the process to S253. The reference frequency spectrum is obtained by multiplying each of the rotation orders of the base spectrum by the transform coefficient $v_k$. The similarity $sm(v_k)$ is calculated according to Equation (1):

[MATH 1]

MATH 1

$$sm(v_k) = \sum_f F_{ref}(v_k)(f) \cdot F_{mes}(f) \quad (1)$$

where $F_{mes}(f)$ denotes an intensity of the frequency spectrum at a frequency f. $F_{ref}(v_k)(f)$ denotes an intensity of the reference frequency spectrum at the frequency f. In S253, the controller 81 determines a transform coefficient $v_M$ which yields a maximum similarity $sm(v_k)$, according to Equation (2), and passes the process to S254.

[MATH 2]

$$sm(v_M) = \max(sm(v_{min}), \ldots, sm(v_M), \ldots, sm(v_{max})) \quad (2) \text{MATH 2}$$

In S254, using the transform coefficient $v_M$ as the rotational frequency of the main shaft 22, the controller 81 sets a rotational speed (r corresponding to that rotational frequency $v_M$ as the rotational speed for use in the abnormality diagnosis, and returns the process to the main routine. The rotational speed $\omega_r$ is a rotational speed that is estimated as a rotational speed of the main shaft 22 when the vibration data is measured.

In the following, referring to FIGS. 11 and 12, overlap relationship of the inner product of the two spectrums calculated in the similarity calculation process (S252) of FIG. 10 and these two spectrums is described.

FIG. 11 is a diagram showing (a) one example base spectral pattern and (b) one example frequency spectrum produced from the vibration data that is measured at the abnormality diagnosis. As shown in (a) of FIG. 11, the rotation orders r11 through r14 are those corresponding to the characteristic frequencies, and peaks occur at the rotation orders r11 through r14.

FIG. 12 is a diagram showing the frequency spectrum (the solid line) of FIG. 11 and the reference frequency spectrum (the dotted line) overlaid, one on top of the other. The reference frequency spectrums in (a) through (c) of FIG. 12 are those obtained by multiplying the rotation orders of the base spectral pattern of (a) of FIG. 11 by the transform coefficients $v_1$ to $v_3$, respectively, ($v_{min} \leq v_1 < v_2 < v_3 \leq v_{max}$). In FIG. 12, the hatched regions are where the reference frequency spectrum and the frequency spectrum overlap.

As shown in FIG. 12, among (a) through (c) of FIG. 12, (b) of FIG. 12 shows the overlap region of the reference frequency spectrum and the frequency spectrum that has the largest area. The greater the area of the overlap region of the reference frequency spectrum and the frequency spectrum, the greater the inner product calculated according to Equation (1). The more the reference frequency spectrum and the frequency spectrum are similar to each other, the greater the overlap area of the two. Thus, the state monitoring system 1 employs the inner product of the two as the similarity.

Embodiment 1 has been described with reference to using an acceleration sensor as the vibration sensor. The vibration sensor is not limited to the acceleration sensor. For example, a velocity sensor, a displacement sensor, an AE (Acoustic Emission) sensor, an ultrasonic sensor, a temperature sensor, or an acoustic sensor may be used.

The controller included in the state monitoring system according to Embodiment 1 is also capable of converting the vibration data, obtained from the vibration sensor, to a vibration value, such as rms, a peak value, an OA value, or an average of vibration values in a predetermined interval. The controller is further capable of selecting a filter, such as a low-pass filter, a high-pass filter, or a band-pass filter, and limiting the frequency band in which the vibration data is measured.

While Embodiment 1 has been described with reference to the use of the rotational speed of the main shaft of the wind power generator for the abnormality diagnosis, the rotational speed used in the abnormality diagnosis is not limited to the rotational speed of this main shaft. Moreover, while Embodiment 1 has been described with reference to the step-up gearbox of the wind power generator as a target of the abnormality diagnosis, the target of the abnormality diagnosis is not limited to that step-up gearbox.

From the foregoing, according to the state monitoring device and the state monitoring system of Embodiment 1, the abnormality diagnosis can be performed with improved stability on an appliance to which the rotational torque is transmitted from the rotating body.

Embodiment 2

Embodiment 1 has been described with reference to the abnormality diagnosis system which includes the rotational sensor. Embodiment 2 will be described with reference to an abnormality diagnosis system which includes no rotational sensor.

Embodiment 2 is different from Embodiment 1 in that no rotational sensor is employed in Embodiment 2. FIGS. 2 through 4 with respect to Embodiment 1 are replaced with FIGS. 13 through 15, respectively, with respect to Embodiment 2.

Figure 13:
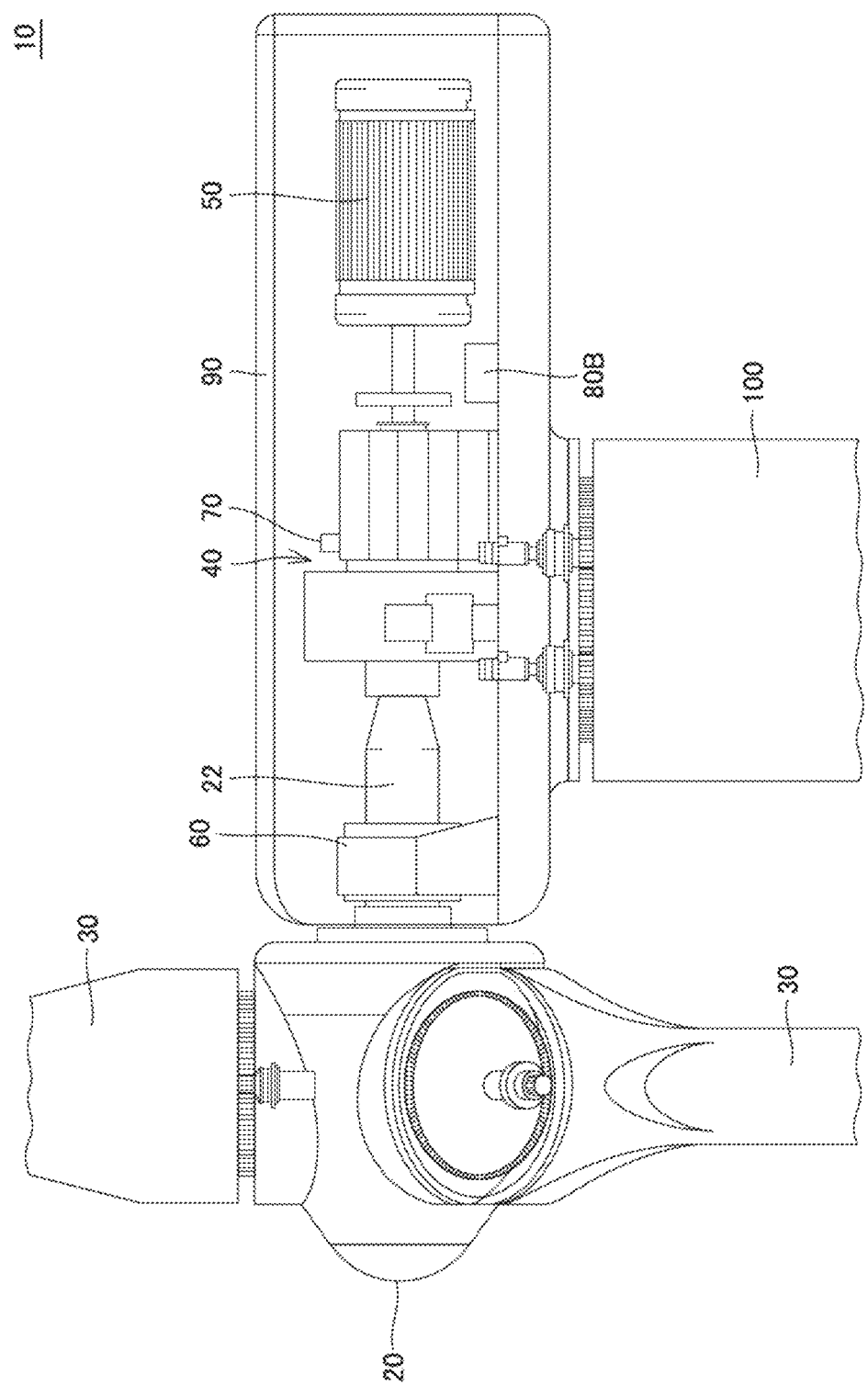
FIG. 13 is a diagram schematically showing the inside of a nacelle of a wind power generator, accommodating a state monitoring device according to Embodiment 2.

FIG. 13 is a diagram schematically showing the inside of a nacelle 90 accommodating a state monitoring device 80B according Embodiment 2. The internal configuration of the nacelle 90, shown in FIG. 13, is the same as the internal configuration of the nacelle 90 of FIG. 2, except that the rotational sensor 77 is removed from the nacelle 90 and the state monitoring device 80 is replaced with a state monitoring device 80B. Thus, the description will not be repeated.

Figure 14:
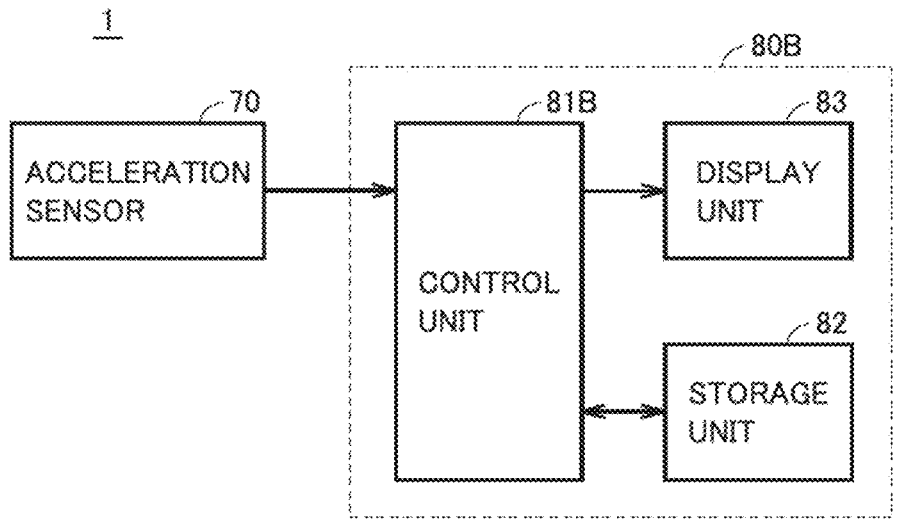
FIG. 14 is a functional block diagram showing a functional configuration of the state monitoring system according to Embodiment 2.

FIG. 14 is a functional block diagram showing a functional configuration of a state monitoring system 2 according Embodiment 2. The configuration of the state monitoring system 2, shown in FIG. 14, is the same as the configuration of the state monitoring system 1 of FIG. 3, except that the rotational sensor 77 is removed from the nacelle 90 and the controller 81 is replaced with a controller 81B. Thus, the description will not be repeated.

The controller 81B simulates processes corresponding to S11 through S15 of FIG. 5, based on, for example, design data of a monitored target. A base spectral pattern produced through the simulation is saved to a storage unit 82, prior to performing abnormality diagnosis on the monitored target.

Figure 15:
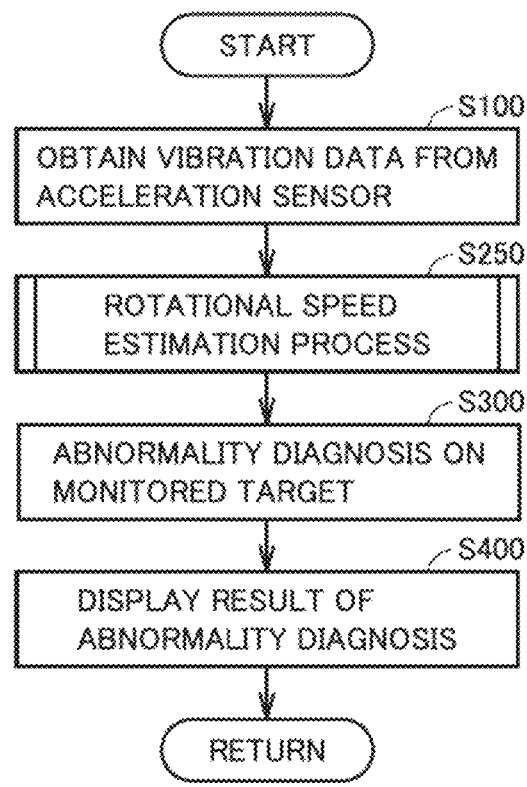
FIG. 15 is a flowchart showing a flow of a process for abnormality diagnosis performed by a controller of FIG. 14.

FIG. 15 is a flowchart showing a flow of a process for the abnormality diagnosis performed by the controller 81B of FIG. 14. The process shown in FIG. 15 includes S250 of FIG. 9 replacing S200 of FIG. 4. The state monitoring system 2 uses an estimated rotational speed of a main shaft 22 for the abnormality diagnosis, rather than the actual rotational speed of the main shaft 22.

From the foregoing, according to the state monitoring device and the state monitoring system of Embodiment 2, the abnormality diagnosis can be performed with improved stability on an appliance to which a rotational torque is transmitted from a rotating body. Moreover, according the state monitoring device and the state monitoring system of Embodiment 2, the rotational sensor is not required. Thus, cost reduction of the state monitoring system can be achieved.

Embodiment 3

Embodiments 1 and 2 have been described with reference to estimating the rotational speed of the rotating body, using a base spectral pattern. Embodiment 3 will be described with reference to estimating the rotational speed of the rotating body, using a relational expression derived by regression analysis of multiple combinations of a rotational speed of the rotating body and a vibration value of vibration data of an appliance.

According to a state monitoring device and a state monitoring system of Embodiment 3, the rotational speed of the rotating body can be estimated with accuracy even in the case where it is difficult to produce a base spectral pattern (e.g., the wind power generator does not include a step-up gearbox or mesh vibration of the gear of the step-up gearbox is extremely small relative to the vibration of the entirety of the wind power generator).

Embodiment 3 is different from Embodiment 1 in the process that is performed by a controller prior to the abnormality diagnosis and the rotational speed setting process. In other words, Embodiment 3 and Embodiment 1 are the same, except for including FIG. 16 and FIG. 19 replacing FIG. 5 and FIG. 9 of Embodiment 1. Thus, the description will not be repeated.

Figure 16:
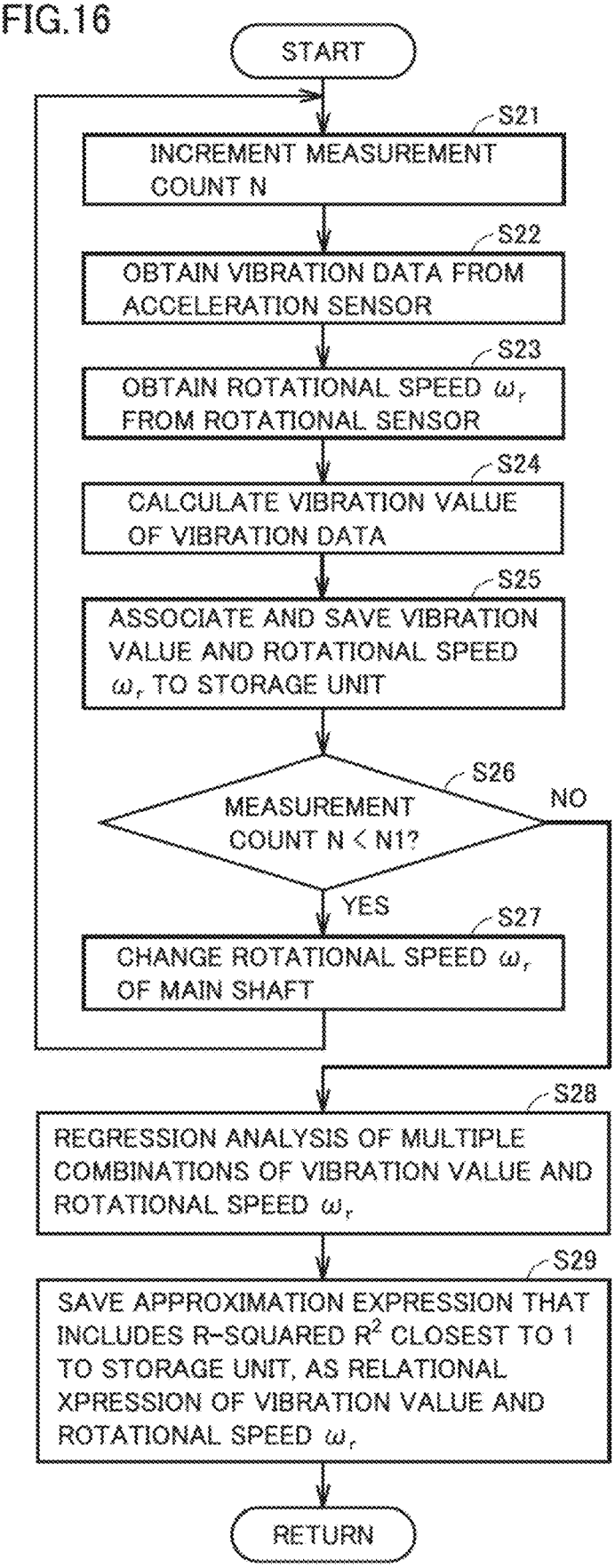
FIG. 16 is a flowchart showing a flow of a process for deriving a relational expression of a rotational speed and a vibration value, performed by a controller according to Embodiment 3, prior to abnormality diagnosis.

FIG. 16 is a flowchart showing a flow of a process for deriving a relational expression of the rotational speed and the vibration value, performed by the controller according to Embodiment 3, prior to the abnormality diagnosis. Note that, in FIG. 16, the initial value of a measurement count N is zero.

As shown in FIG. 16, in S21, the controller adds 1 to a measurement count N, and passes the process to S22. In S22, the controller obtains vibration data from an acceleration sensor 70, and passes the process to S23. In S23, the controller obtains a rotational speed w of the main shaft from a rotational sensor 77, and passes the process to S24. In S24, the controller calculates a vibration value of the vibration data obtained in S22, and passes the process to S25. In S25, the controller associates and saves to a storage unit the rotational speed $\omega_r$ obtained in S23 and the vibration value calculated in S24, and passes the process to S26.

In S26, the controller determines whether the measurement count N is less than a scheduled count N1. If the measurement count N is less than the scheduled count N1 (YES in S26), the controller, in S27, changes the rotational speed $\omega_r$ of the main shaft, and passes the process to S21.

If the measurement count N is greater than or equal to the scheduled count N1 (NO in S26), the controller, in S28, performs the regression analysis on multiple combinations of the vibration value stored in the storage unit and the rotational speed $\omega_r$, approximates the relational expression of the vibration value and the rotational speed $\omega_r$ by multiple fitting methods, and passes the process to S29. The fitting methods used in S28 are, for example, polynomial fitting, exponential fitting, and linear fitting. In S29, the controller calculates R-squared $R^2$ for each of the approximation expressions calculated in S28, saves to the storage unit an approximation expression that includes R-squared $R^2$ closest to 1, among the approximation expressions obtained by the regression analysis, as a relational expression (specific information) of the vibration value and the rotational speed $\omega_r$, and returns the process to the main routine.

Figure 17:
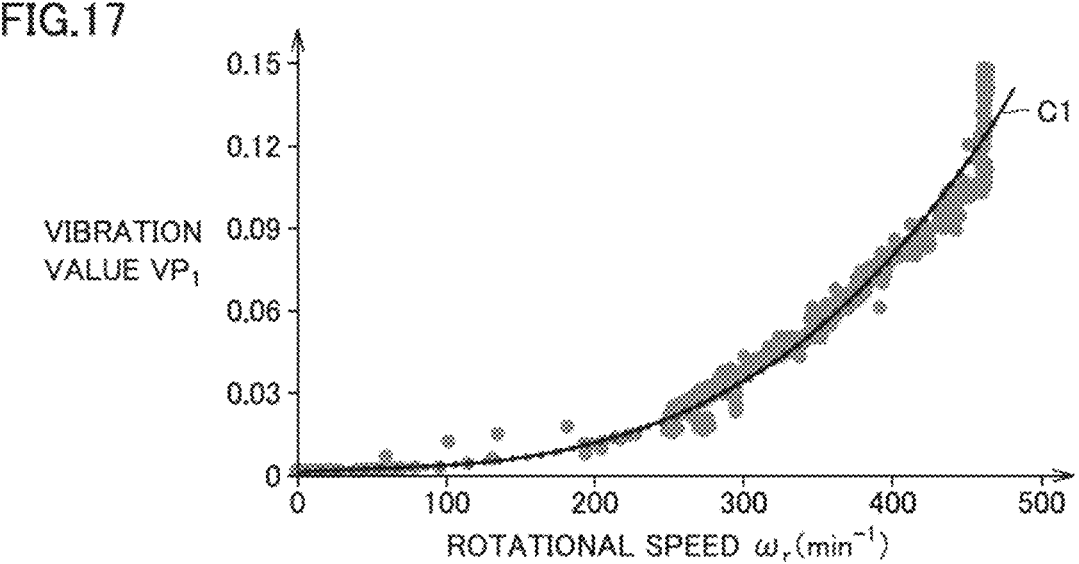
FIG. 17 is a diagram showing a coordinate plane on which points designated by multiple combinations of a vibration value of a step-up gearbox and the rotational speed of a main shaft are plotted.

FIG. 17 is a diagram showing a coordinate plane on which points designated by multiple combinations of a vibration value $VP_1$ of the step-up gearbox and the rotational speed $\omega_r$ of the main shaft are plotted. As shown in FIG. 17, the relationship of the vibration value $VP_1$ of the step-up gearbox and the rotational speed $\omega_r$ of the main shaft is approximated as a curve C1. A relational expression corresponding to the curve C1 is expressed as Equation (3):

[MATH 3]

$$VP_1 = 10^{-9} \cdot \omega_r^3 - 2 \cdot 10^{-7} \cdot \omega_r^2 + 2 \cdot 10^{-5} \cdot \omega_r + 0.0017 \quad \text{(3)MATH 3}$$

where R-squared $R^2$ is 0.9806.

Figure 18:
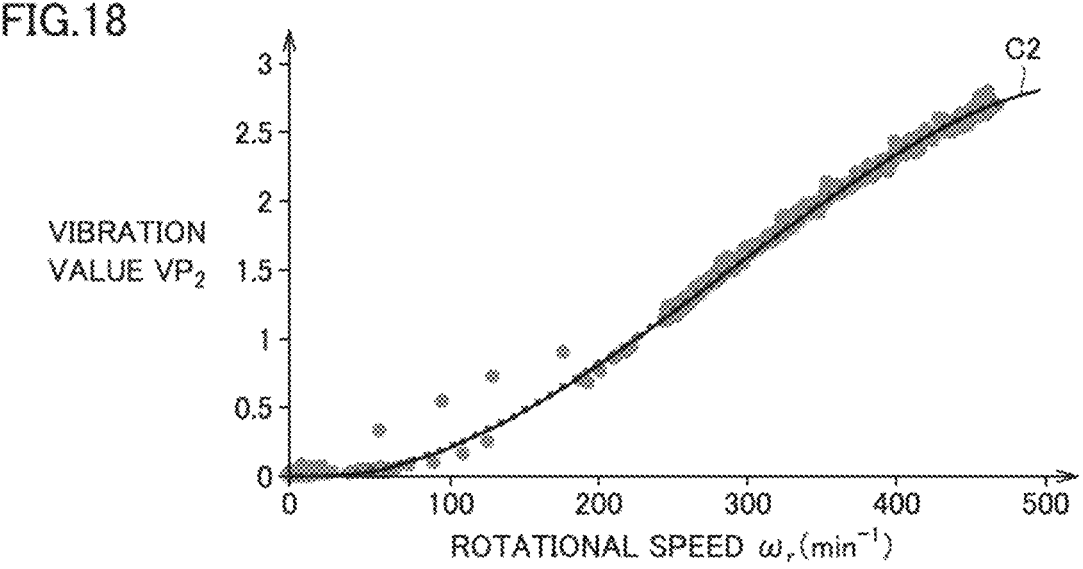
FIG. 18 is a diagram showing a coordinate plane on which points designated by multiple combinations of a vibration value of the main shaft and a rotational speed of the main shaft are plotted.

Note that the vibration value used in the estimation of the rotational speed $\omega_r$ of the main shaft is not limited to the vibration value calculated from the vibration data of the step-up gearbox. For example, the vibration value may be calculated from vibration data of the main shaft. FIG. 18 is a diagram showing a coordinate plane on which points designated by multiple combinations of a vibration value $VP_2$ and the rotational speed $\omega_r$ of the main shaft are plotted. As shown in FIG. 18, the relationship of the vibration value $VP_2$ of the main shaft and the rotational speed $\omega_r$ of the main shaft is approximated as a curve C2. A relational expression corresponding to the curve C2 is represented as Equation (4):

[MATH 4]

$$VP_2 = -4 \cdot 10^{-8} \cdot \omega_r + 3 \cdot 10^{-5} \cdot \omega_r^2 - 10^{-3} \cdot \omega_r + 0.0062 \quad \text{(4)MATH 4}$$

where R-squared $R^2$ is 0.999.

Multiple relational expressions of the vibration value and the rotational speed co may be saved to the storage unit. For example, a relational expression of the vibration value of the step-up gearbox and the rotational speed co of the main shaft, and a relational expression of the vibration value of the main shaft and the rotational speed $\omega_r$ of the main shaft may be saved to the storage unit.

Figure 19:
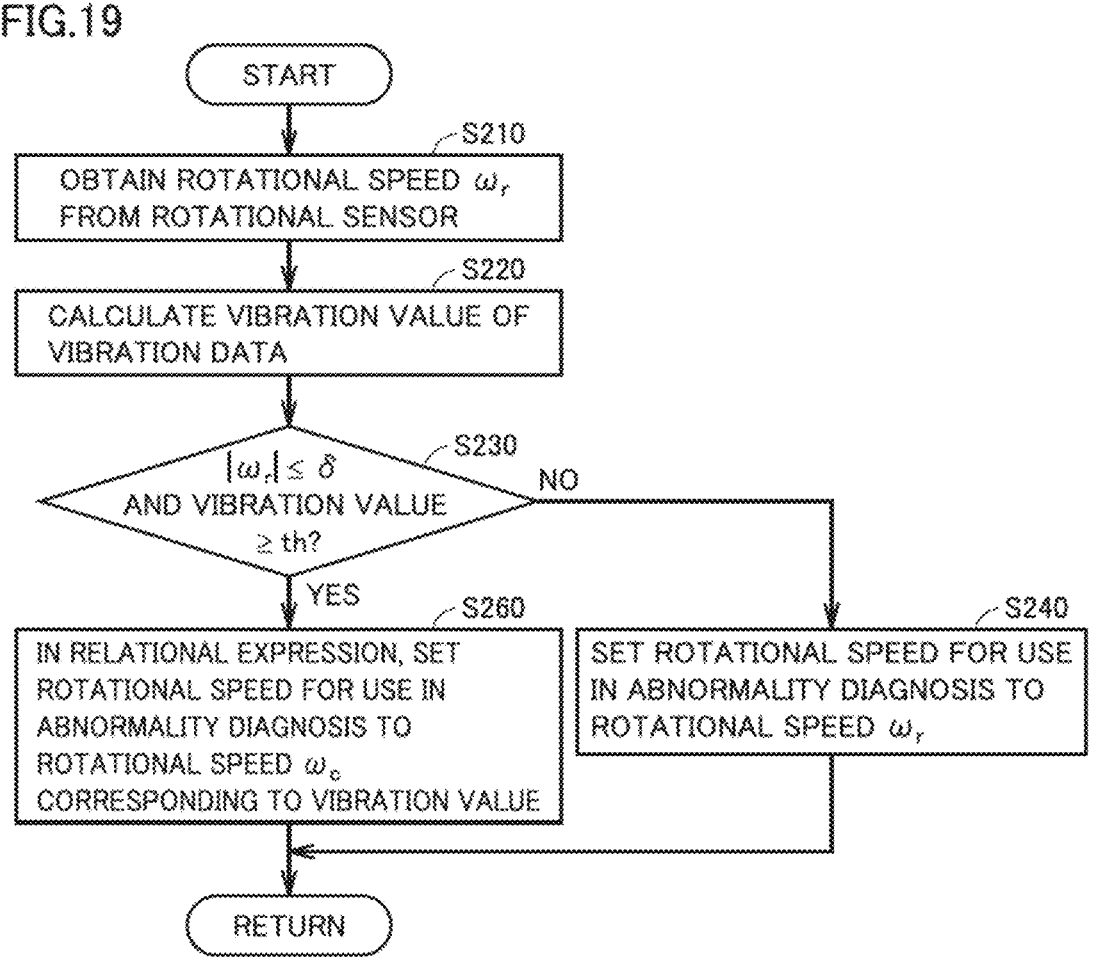
FIG. 19 is a flowchart showing a flow of a process for setting a rotational speed according to Embodiment 3.

FIG. 19 is a flowchart showing a flow of a process for setting the rotational speed according to Embodiment 3. The process illustrated in FIG. 19 includes S260 replacing S250 of FIG. 9.

As shown in FIG. 19, the controller performs S210, S220, and S230. If NO in S230, the controller performs S240 and returns the process to the main routine. If YES in S230, the controller, in S260, calculates a rotational speed $\omega_c$ corresponding to the vibration value calculated in S220, using the relational expression stored in the storage unit, sets a rotational speed for use in the abnormality diagnosis to the rotational speed $\omega_c$, and returns the process to the main routine.

Figure 20:
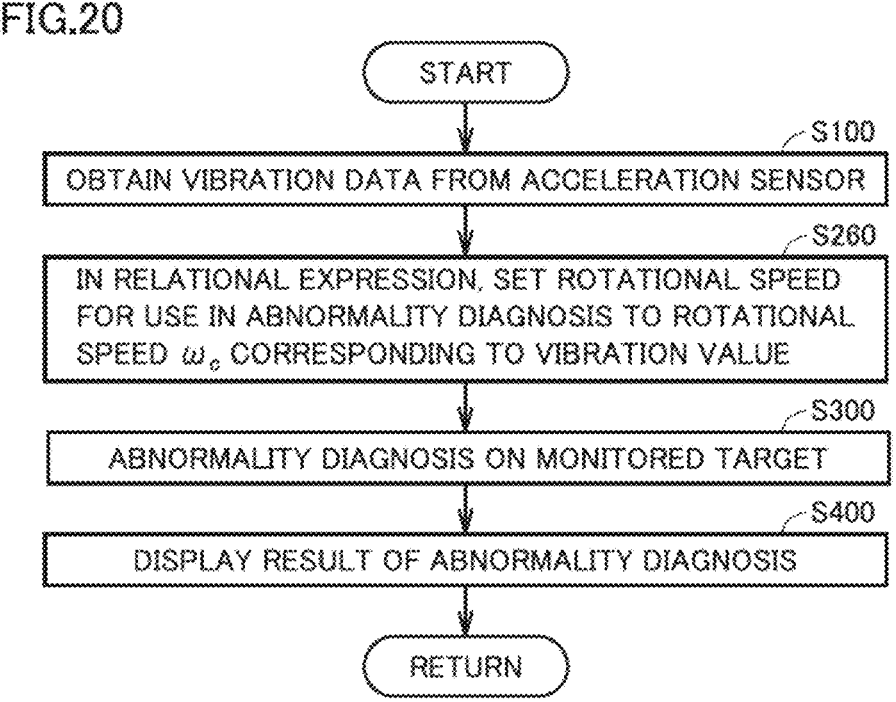
FIG. 20 is a flowchart showing a flow of a process for abnormality diagnosis according to a variation of Embodiment 3.

Note that, as with Embodiment 2, in the relational expression stored in the storage unit, the rotational speed for use in the abnormality diagnosis may be set to the rotational speed cc corresponding to the vibration value, without the use of a rotational sensor for the abnormality diagnosis. The abnormality diagnosis process in this case includes S260 of FIG. 19 replacing S250 of FIG. 15, as shown in FIG. 20.

From the foregoing, according to the state monitoring device and the state monitoring system of Embodiment 3, the abnormality diagnosis can be performed with improved stability on an appliance to which the rotational torque is transmitted from a rotating body.

Embodiment 4

Embodiments 1 to 3 have been described with reference to one acceleration sensor being included in the state monitoring system. Embodiment 4 will be described with reference to a state monitoring system including multiple acceleration sensors.

Embodiment 4 is different from Embodiment 1 in that the state monitoring system according to Embodiment 4 includes multiple acceleration sensors, and estimation of the rotational speed using a base spectral pattern and estimation of the rotational speed using a relational expression of a vibration value and the rotational speed are differentiated in the abnormality diagnosis. In other words, FIGS. 21 through 24 with respect to Embodiment 4 replaces FIGS. 2, 3, 9, and 10 with respect to Embodiment 1. According to a state monitoring device and the state monitoring system of Embodiment 4, degradation in accuracy of the estimation of the rotational speed caused by noise in the vibration data can be inhibited.

Figure 21:
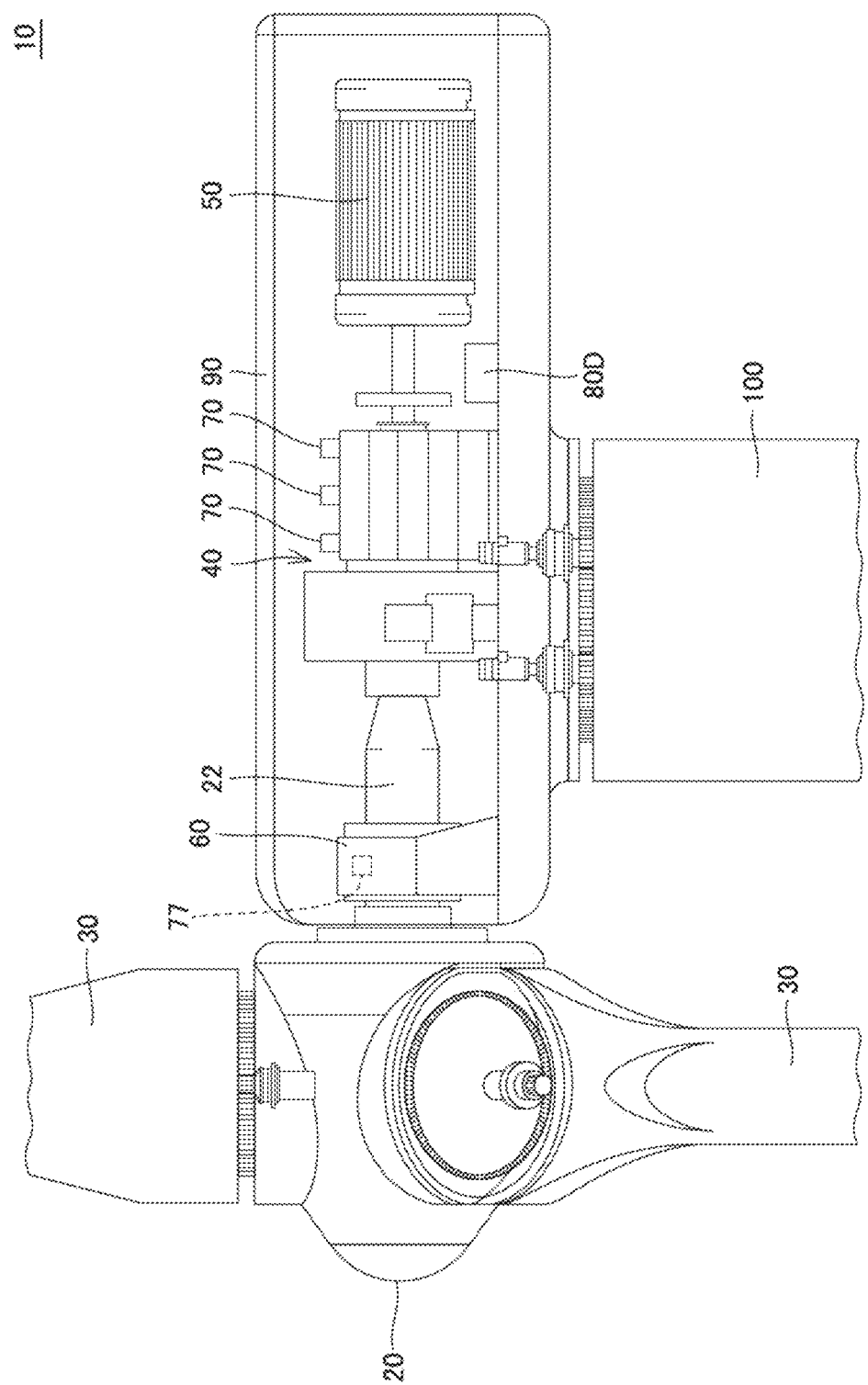
FIG. 21 is a diagram schematically showing the inside of a nacelle accommodating a state monitoring device according to Embodiment 4.

FIG. 21 is a diagram schematically showing the inside of a nacelle 90 accommodating a state monitoring device 80D according to Embodiment 4. Embodiment 4 is the same as Embodiment 1, except that the internal configuration of the nacelle 90 of FIG. 21 includes multiple acceleration sensors 70 in the step-up gearbox 40 of FIG. 2, and includes the state monitoring device 80D in place of the state monitoring device 80. Thus, the description will not be repeated.

Figure 22:
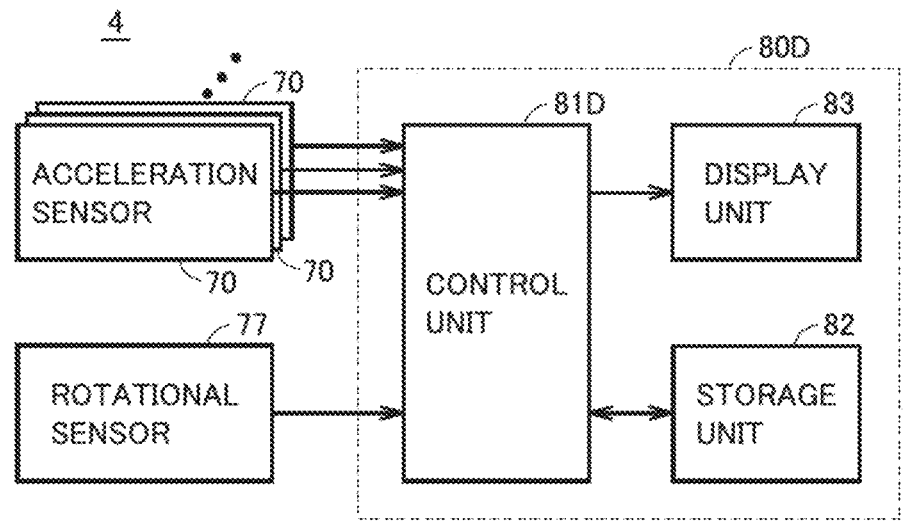
FIG. 22 is a functional block diagram showing a functional configuration of the state monitoring system according to Embodiment 4.

FIG. 22 is a functional block diagram showing a functional configuration of a state monitoring system 4 according to Embodiment 4. The configuration of the state monitoring system 4 is the same as the configuration of the state monitoring system 1 of FIG. 3, except that the state monitoring system 4 includes multiple acceleration sensors 70, and includes the state monitoring device 80D in place of the state monitoring device 80. The state monitoring device 80D is the same as the state monitoring device 80, except for including a controller 81D in place of the controller 81. Thus, the description will not be repeated.

The controller 81D receives vibration data from the acceleration sensors 70. The controller 81D performs the process illustrated in FIG. 5 on each vibration data, prior to the abnormality diagnosis. The controller 81D performs the process illustrated in FIG. 16 on each vibration data, prior to the abnormality diagnosis. As a result, multiple base spectral patterns and multiple relational expressions of the vibration value of the step-up gearbox 40 and the rotational speed of the main shaft 22 are saved to the storage unit 82.

Figure 23:
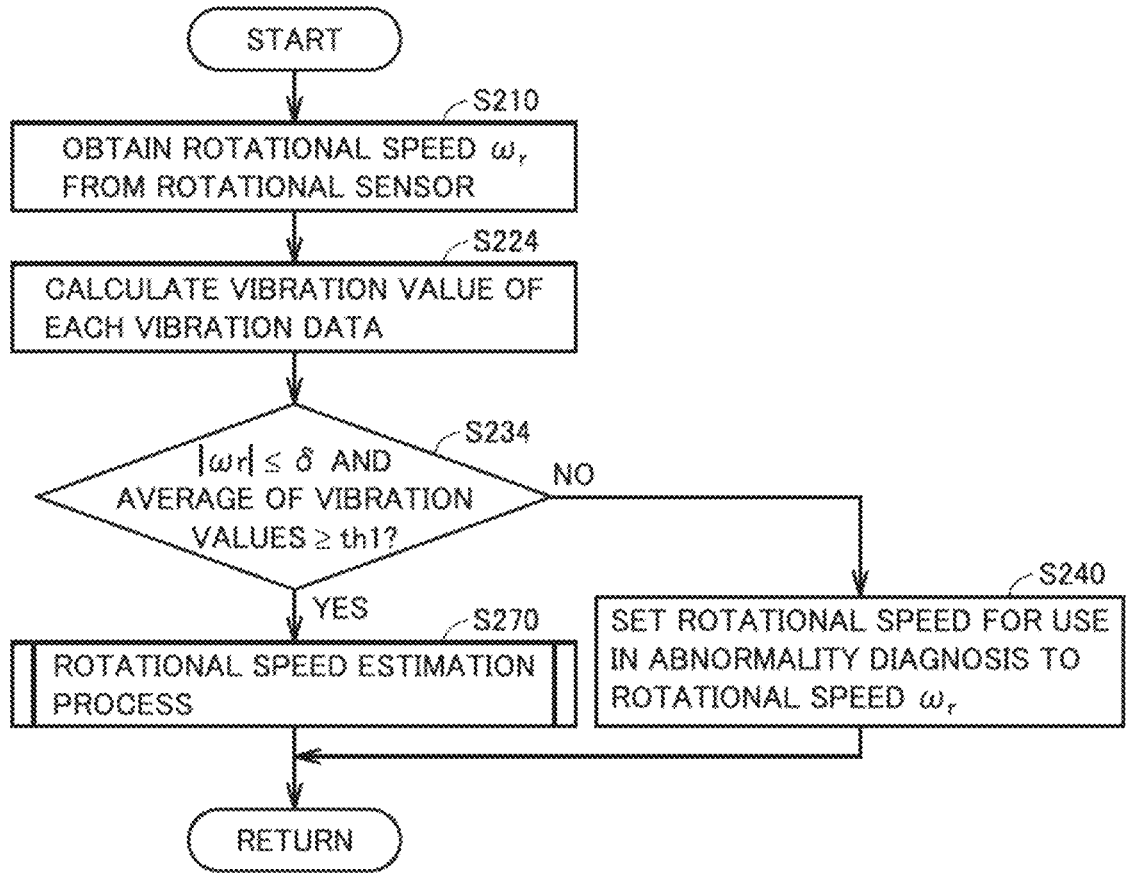
FIG. 23 is a flowchart showing a flow of a process for setting a rotational speed performed in Embodiment 4.

FIG. 23 is a flowchart showing a flow of a process for setting a rotational speed in Embodiment 4. The flowchart illustrated in FIG. 23 includes S224, S234, and S270, replacing S220, S230, and S250, respectively, of FIG. 9.

As shown in FIG. 23, after S210, the controller 81D, in S224, calculates a vibration value of each of the vibration data that are received from the acceleration sensors 70, and passes the process to S234. In S234, the controller 81D determines whether a rotational sensor 77 is faulty. Specifically, the controller 81D determines that the rotational sensor 77 is faulty if a fault condition is met: that the absolute value of the rotational speed $\omega_r$ is less than or equal to a threshold $\delta$ and an average of the vibration values, calculated in S224, is greater than or equal to a threshold th1.

If the fault condition is not met (NO in S234), the controller 81D performs S240 and returns the process to the main routine. If the fault condition is met (YES in S234), the controller 81D, in S270, performs a rotational speed estimation process, sets the rotational speed for use in the abnormality diagnosis to the estimated rotational speed, and returns the process to the main routine.

Figure 24:
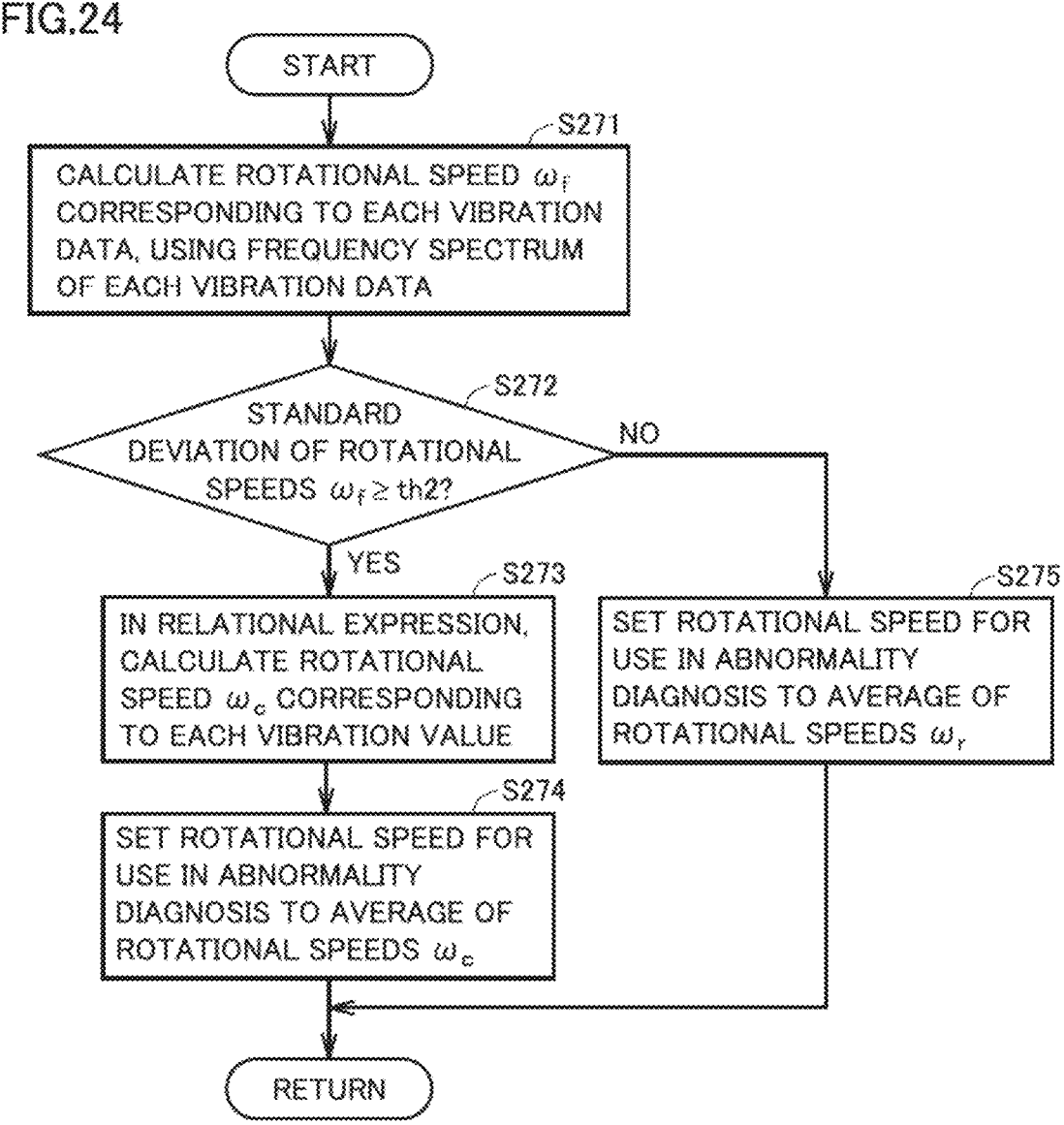
FIG. 24 is a flowchart showing a specific flow of process of a rotational speed estimation process of FIG. 23.

FIG. 24 is a flowchart showing a specific flow of process of the rotational speed estimation process (S270) of FIG. 23. In S271, the controller 81D calculates a rotational speed $\omega_r$ corresponding to each vibration data by performing the process of FIG. 10 on each vibration data, and passes the process to S272.

In S272, the controller 81D determines whether the standard deviation of the rotational speeds $\omega_f$ is greater than or equal to a threshold th2. If the standard deviation of the rotational speeds $\omega_f$ is greater than or equal to the threshold th2 (YES in S272), the controller 81D determines that the level of noise included in the multiple pieces of vibration data is high and the accuracy of the rotational speed $\omega_f$ is thus low, and passes the process to S273. In S273, using the relational expression stored in the storage unit, the controller 81D calculates a rotational speed $\omega_c$ corresponding to each of the vibration values calculated in S224 of FIG. 23, and passes the process to S274 of FIG. 24. In S274, the controller 81D sets the rotational speed for use in the abnormality diagnosis to the average of the rotational speeds $\omega_c$ calculated in S273, and returns the process to the main routine. In S274, the rotational speed for use in the abnormality diagnosis may be set to the median of the rotational speeds $\omega_c$.

If the standard deviation of the rotational speeds $\omega_f$ is less than the threshold th2 (NO in S272), the controller 81D, in S275, sets the rotational speed for use in the abnormality diagnosis to the average of the rotational speeds $\omega_f$ calculated in S273, and returns the process to the main routine. In S275, the rotational speed for use in the abnormality diagnosis may be set to the median of the rotational speeds $\omega_f$.

From the foregoing, according to the state monitoring device and the state monitoring system of Embodiment 4, the abnormality diagnosis can be performed with improved stability on an appliance to which a rotational torque is transmitted from a rotating body. Moreover, according to the state monitoring device and the state monitoring system of Embodiment 4, the estimation of the rotational speed using a base spectral pattern and the estimation of the rotational speed using a relational expression of the vibration value and the rotational speed are differentiated in the abnormality diagnosis, depending on a level of noise in the vibration data measured by the acceleration sensors, thereby inhibiting degradation in accuracy of the estimation of the rotational speed caused by the noise in the vibration data.

The presently disclosed embodiments are also expected to be combined and implemented as appropriate within a consistent range. The presently disclosed embodiments should be considered in all aspects as illustrative and not restrictive. The scope of the present invention is defined by the appended claims, rather than by the description above. All changes which come within the meaning and range of equivalency of the appended claims are to be embraced within their scope.

REFERENCE SIGNS LIST 1,2 state monitoring system; 10 wind power generator; 20 rotor head; 22 main shaft; 30 blade; 40 step-up gearbox; 50 generator; 60 main bearing; 70 acceleration sensor; 77 rotational sensor; 80, 80B, 80D state monitoring device; 81, 81B, 81D controller; 82 storage unit; 83 display unit; 90 nacelle; and 100 tower.

The invention claimed is:

1. A state monitoring device for monitoring a state of an appliance to which a rotational torque of a rotating body is transmitted, the state monitoring device comprising:
a storage unit pre-storing specific information produced from vibration data of the appliance,
the specific information depending on a rotational speed of the rotating body; and
a controller which performs an abnormality diagnosis on the appliance, using the rotational speed of the rotating body and the vibration data of the appliance, wherein
using the specific information, the controller estimates the rotational speed of the rotating body, the rotational speed being a rotational speed of the rotating body when the vibration data of the appliance is measured,
the specific information includes a base spectral pattern,
the base spectral pattern is a spectrum obtained by converting frequencies of a first frequency spectrum produced from first vibration data of the appliance into rotation orders,
the first vibration data is vibration data of the appliance while the rotating body is rotating at a specific rotational speed,
the rotation orders are each a ratio of the first frequency spectrum to a rotational frequency corresponding to the specific rotational speed, wherein
the controller calculates a similarity between a second frequency spectrum produced from a second vibration data of the appliance and a third frequency spectrum obtained by multiplying each of the rotation orders of the base spectral pattern by a transform coefficient, and
based on the transform coefficient that yields a highest similarity when the transform coefficient is varied within a predetermined range, the controller estimates the rotational speed, the rotational speed being a rotational speed when the second vibration data is measured.

2. The state monitoring device according to claim 1, wherein
the first frequency spectrum includes a plurality of frequency bands each of which contains a specific frequency related to the appliance and a harmonic frequency of the specific frequency, and
the base spectral pattern is a spectrum which is obtained by setting to zero intensities corresponding to all frequencies not included in the plurality of frequency bands of the first frequency spectrum, and converting the frequencies of the first frequency spectrum into the rotation orders.

3. The state monitoring device according to claim 1, wherein
the similarity is an inner product of the second frequency spectrum and the third frequency spectrum.

4. A state monitoring system, comprising:
at least one vibration sensor which measures the vibration data;
a rotational sensor which measures the rotational speed; and
the state monitoring device according to claim 1.

5. The state monitoring system according to claim 4, wherein
the controller obtains the rotational speed of the rotating body from the rotational sensor,
when a condition indicating a fault of the rotational sensor is met, the controller uses the rotational speed, estimated by the controller, to perform the abnormality diagnosis, and
when the condition is not met, the controller uses the rotational speed, obtained from the rotational sensor, to perform the abnormality diagnosis.

6. The state monitoring system according to claim 5, wherein
the at least one vibration sensor includes two or more vibration sensors,
as the specific information, a relational expression of the rotational speed of the rotating body and a vibration value of the vibration data of the appliance is pre-stored in the storage unit included in the state monitoring device,
the relational expression is derived from regression analysis of a plurality of combinations of the rotational speed of the rotating body and the vibration value of the vibration data of the appliance, wherein
when the condition is met,
using the base spectral pattern, the controller calculates a plurality of first rotational speeds corresponding to a plurality of vibration data items measured by the at least one vibration sensor,
when a standard deviation of the plurality of first rotational speeds is greater than a threshold, the controller performs the abnormality diagnosis, using an average or median of a plurality of second rotational speeds corresponding to vibration values of the plurality of vibration data items, and
when the standard deviation is less than the threshold, the controller performs the abnormality diagnosis, using an average or median of the plurality of first rotational speeds.

7. A state monitoring device for monitoring a state of an appliance to which a rotational torque of a rotating body is transmitted, the appliance being separated from the rotating body, the state monitoring device comprising:
- a storage unit pre-storing specific information produced from vibration data of the appliance, the specific information depending on a rotational speed of the rotating body; and
- a controller which performs an abnormality diagnosis on the appliance, using the rotational speed of the rotating body and the vibration data of the appliance, wherein
- using the specific information, the controller estimates the rotational speed of the rotating body, the rotational speed being a rotational speed of the rotating body when the vibration data of the appliance is measured,
- the specific information includes a specific relational expression of the rotational speed of the rotating body and a vibration value of the vibration data of the appliance,
- using, for the specific relational expression, the rotational speed corresponding to a vibration value of a specific vibration data of the appliance, the controller estimates the rotational speed of the rotating body, the rotational speed being a rotational speed when the specific vibration data of the appliance is measured, and
- the controller approximates a relational expression of the rotational speed of the rotating body and the vibration value of the vibration data of the appliance by each of multiple fitting methods in a regression analysis, and saves to the storage unit an approximation expression that includes R-squared closest to 1, among multiple approximation expressions respectively approximated by the multiple fitting methods, as the specific relational expression.

\* \* \* \* \*